United States Patent [19]
Iiyama et al.

[11] Patent Number: 5,935,683
[45] Date of Patent: Aug. 10, 1999

[54] WATERPROOF MATERIAL AND METHOD FOR APPLYING IT

[75] Inventors: Takashi Iiyama, Chiba; Eiichi Yamasaki, Kanagawa; Takashi Nakano, Chiba; Yoshikazu Ishida, Saitama, all of Japan

[73] Assignee: Mitsui Chemicals, Inc., Tokyo, Japan

[21] Appl. No.: 08/838,261

[22] Filed: Apr. 17, 1997

[30] Foreign Application Priority Data

| Apr. 24, 1996 | [JP] | Japan | 8-102213 |
| Jul. 3, 1996 | [JP] | Japan | 8-173288 |

[51] Int. Cl.⁶ ........................ B32B 3/10
[52] U.S. Cl. ............ 428/141; 428/113; 428/364; 264/331.11; 264/333; 156/71
[58] Field of Search ............ 156/60, 61, 71, 156/242, 243; 264/307.1, 331.11, 331.15, 1, 71, 333; 428/95, 141, 113, 364, 142, 143, 292.1, 297.1, 297.4, 300.7

[56] References Cited

U.S. PATENT DOCUMENTS 5,403,631  4/1995  Sato ........................................ 428/15

FOREIGN PATENT DOCUMENTS

| 63-186774 | 8/1988 | Japan . |
| 1-219242 | 9/1989 | Japan . |
| 4-142323 | 5/1992 | Japan . |
| 7016850 | 1/1995 | Japan . |
| 8025485 | 1/1996 | Japan . |
| 9077836 | 3/1997 | Japan . |

*Primary Examiner*—Merrick Dixon
*Attorney, Agent, or Firm*—Burns, Doane, Swecker & Mathis, L.L.P.

[57] ABSTRACT

A waterproof material is disclosed herein which is obtainable by laminating many sheets of a photo-setting type fiber reinforced thermosetting resin composition comprising a resin composition containing a thermosetting resin, a photopolymerization initiator and a thickener, and a fiber reinforced material, or by laminating plural sheets of a synthetic polymer, and a waterproof application method using the waterproof material is also disclosed herein. According to the present invention, the waterproof layer can be formed on the surface of a civil engineering works or a building in a short time of about 30 minutes by a few steps without polluting a working environment. Furthermore, the waterproof layer, needless to say, has water resistance, weathering resistance, anticorrosion and substrate adhesion. In addition, it is further excellent in follow-up properties to cracks of the substrate, and walking on the waterproof layer is possible.

10 Claims, 2 Drawing Sheets

WATERPROOF MATERIAL AND METHOD FOR APPLYING IT

BACKGROUND OF THE INVENTION

FIELD OF THE INVENTION

The present invention relates to a novel waterproof material for civil engineering works and buildings, and a method for applying a waterproof layer. More specifically, it relates to a method for forming a waterproof layer in a short period of time by a simple spread operation and light irradiation, and a waterproof material which can control environmental pollutions such as the emission of a polymerizable monomer and the scattering of chips of a fibrous reinforcing material during the operation.

Heretofore, on the rooftops and verandas of concrete structures such as condominiums and apartments, the verandas of wooden structures such as houses, and metallic structures such as bridges, waterproof construction has been carried out by the use of waterproof materials described in Japanese Architectural Standard Specification JASS8 Waterproofing and Sealing (published by Architectural Institute of Japan) of the same, for example, an bitumen waterproof material, a synthetic polymer sheet waterproof material and a liquid-applied compounds for waterproofing membrane coating typified by a polyurethane resin for the purpose of preventing the leaking of water.

In this connection, the above various waterproof materials have excellent waterproof performances, but the waterproof materials and waterproof layers are required to have various performances such as not only waterproof properties but also walking properties, anticorrosion, heat insulating properties, sound insulating properties, applicability, aesthetic properties and economy. Therefore, these waterproof materials have been selectively used in compliance with a purpose and a use.

The bitumen waterproof material has widely used because of reliability based on its thickness and a low cost. However, this material is not suitable for walking when it is used as the exposed waterproof material, and it is necessary to form a hard protective layer by a covering mortor or the like, which requires a prolonged application period and a much cost. Additionally, as a load of protection layer is about 120 kg/m² the building structure has to posses high strength.

Furthermore, in the synthetic polymer sheet waterproof material, its application period is short, and the reliability of its thickness is high because of factory production. However, this kind of waterproof material inconveniently requires smooth substrate and in addition, a surface hardness is low and adhesive properties to the substrate are poor. Accordingly, in order to form a waterproof layer for walking, the formation of the protective layer is necessary, as in the above bitumen waterproof material.

On the other hand, the liquid-applied compounds for waterproofing membrane coating is excellent in aesthetic properties and compatibility with the substrate, and the walking resistance strength, the surface hardness and adhesive properties of the material can be ensured by selecting a suitable kind of material, even in the case that it is used for exposed waterproofing. As the liquid-applied compounds for waterproofing membrane coating, the polyurethane resin waterproof material has been most widely used, but in recent years, an FRP waterproof material having the higher walking properties has been spread which comprises an unsaturated polyester resin and a glass fiber reinforced material. This FRP waterproof material is excellent in water resistance and anticorrosion and has the high adhesive properties to the substrate and the high surface hardness, and for these reasons, the FRP waterproof material is suitable for the formation of the waterproof layer for walking (Japanese Patent Application Laid-open No. 142323/1992).

However, the liquid-applied compounds for waterproofing membrane coating is a field reaction type, and so the reaction is affected by a atmospheric temperature, which makes it difficult to control the curing reaction. Hence it is difficult to ensure the uniform thickness of the waterproof layer. In addition, in the waterproof application by the use of the FRP waterproof material, a step of laminating the resin and the fiber reinforced material on each other in the atmosphere is repeated plural times, and the resin is then cured to form the waterproof layer. At this time, there are some problems of environmental pollution, for example, the generation of an odor of a volatile solvent and a monomer contained in a primer or the like, and the scattering of chips of a fiber reinforced material. Moreover, follow-up properties to cracks of the substrate are poor, and breaks occur in the waterproof layer by zero span tension generated at the cracks, so that the trouble of the water leakage is liable to take place.

In contrast to the liquid-applied compounds for waterproofing membrane coating, Japanese Patent Application Laid-open No. 186744/1988 has disclosed a photo-setting resin reinforcing plastic prepreg sheet, and it has also described the application of the plastic prepreg sheet to a waterproof use. This prepreg sheet scarcely gives rise to environmental problems such as the scattering of chips of the fiber reinforced material and the generation of the monomer odor, and it has a prompt and simple applicability. However, the prepreg sheet has the drawback of the FRP waterproof material that the follow-up properties to cracks of the substrate are poor, so that the breaks occur in the waterproof layer.

On the contrary, Japanese Patent Application Laid-open No. 219242/1989 has disclosed a composite method of an FRP layer and a polyurethane resin layer. This is an excellent waterproofing method having the combined features of both the waterproof materials, but in the composite method, the problems of the difficulty of the curing reaction control and the thickness nonuniformity of the waterproof layer which the conventional liquid-applied compounds for waterproofing membrane coating have are not solved, and what is worse, the composite method has a drawback that an application period is long due to the double layers.

A theme of the present invention is to provide a waterproof material which sufficiently holds performances such as water resistance, weathering resistance, substrate adhesion, strength and follow-up properties to cracks of the substrate required for the waterproof material and which further possesses applicability, walking properties, improved operation environment and aesthetic properties, and another theme of the present invention is to provide a method for applying the waterproof material.

SUMMARY OF THE INVENTION

The present inventors have intensively investigated to solve the above problems, and it has been found that a two-layer photo-setting sheet-like waterproof material is effective which comprises a photo-setting resin composition and a fiber reinforced material and which have different hardnesses when cured. As a result of further investigation by the present inventors, it has also been found that a waterproof material constituted of a surface layer comprising a hard layer and a back surface layer comprising a relatively soft layer is particularly effective. That is to say, it has further been found that these waterproof materials comprising the plural layers have a high strength, surface hardness, substrate adhesion and aesthetic properties which are the features of an FRP waterproof material as well as the thickness reliability of the waterproof layer which is the feature of a synthetic polymer sheet waterproof material, and they also have high follow-up properties to cracks of the substrate and permit application thereof in a short period of time by photosetting. On the basis of these findings, the present invention has now been attained.

The above two-layer photo-setting sheet-like waterproof material of the present invention which is constituted of the surface layer comprising the hard layer and the back surface layer comprising the soft layer is based on the following technical conceptions.

That is to say, the first aspect of the present invention is directed to a sheet-like waterproof material which is obtainable by dispersing a fiber reinforced material (B) in either layer of two photo-setting type thermosetting resin compositions $A_1$ and $A_2$ having the substantially same or different viscosities to form two layers having different hardnesses.

The second aspect of the present invention is directed to a sheet-like waterproof material which is obtainable by integrally laminating a hard photo-setting type fiber reinforced thermosetting resin composition (C) and a soft synthetic polymer sheet layer (D) on each other.

The third aspect of the present invention is directed to a sheet-like waterproof material which is obtainable by imparting the density distribution of a fiber reinforced material (B) to the thickness direction of a sheet formed by a kind of photo-setting type thermosetting resin composition.

The photo-setting type sheet-like waterproof materials of the present invention can usually be obtained by the above methods, and the waterproof materials obtained by a combination of these formation methods are also included in the scope of the present invention.

That is to say, according to the present invention, there can be provided a photo-setting type sheet-like waterproof material which is formed by dispersing a fiber reinforced material (B) in a resin composition (A) containing a thermosetting resin composition, a photopolymerization initiator and a thickener so that a surface layer and a back surface layer may be different in hardness when cured.

In the above photo-setting type sheet-like waterproof material, it is preferred that the surface of the waterproof material which adheres to a substrate to be applied and is then cured is the soft layer, and the back surface opposite to the surface is the hard layer.

In this case, it is preferred that a relation between a thickness ($T_1$) of the soft layer and a thickness ($T_2$) of the hard layer meets the relation

10%<($T_2$)/[($T_1$)+($T_2$)]<85%.

In general, the thermosetting resin is selected from the group consisting of unsaturated polyester resins, vinyl ester resins and vinylurethane resins.

The above resin composition (A) preferably comprises a resin composition ($A_1$) having a viscosity ($\eta_1$) of $10^2$ to $10^5$ Pa·s (25° C.) which forms the soft layer, and a resin composition ($A_2$) having a viscosity ($\eta_2$) of $10^3$ to $10^6$ Pa·s (25° C.) which forms the hard layer.

Furthermore, according to the present invention, there can be provided a photo-setting type sheet-like waterproof material which is obtainable by dispersing a fiber reinforced material (B) in a resin composition (A) containing a thermosetting resin composition, a photopolymerization initiator and a thickener to form a surface layer, and then integrally laminating a synthetic polymer sheet (D) as a soft layer.

The above synthetic polymer sheet layer (D) is a vulcanized rubber sheet, a non-vulcanizing rubber sheet, a vinyl chloride resin sheet, an ethylene vinyl acetate resin sheet or a urethane rubber sheet.

It is preferred that the above synthetic polymer sheet (D) is a sheet having holes, and the area of the holes is in the range of 2 to 80% based on the whole area.

Furthermore, according to the present invention, there can be provided a photo-setting type sheet-like waterproof material which is obtainable by densely dispersing a fiber reinforced material (B) in a surface layer of a resin composition (A) containing a thermosetting resin, a photopolymerization initiator and a thickener to form a hard layer, and loosely dispersing the fiber reinforced material (B) in a back surface layer of the resin composition (A) to form a soft layer.

Furthermore, according to the present invention, there can be provided a method for applying a waterproof layer which comprises the steps of dispersing a fiber reinforced material (B) in a resin composition (A) containing a thermosetting resin, a photopolymerization initiator and a thickener so that a surface layer and a back surface layer may be different in hardness when cured, whereby a photo-setting type sheet-like waterproof material is formed, spreading and rotatively pressing the sheet-like waterproof material in such a state that the soft surface of the waterproof material may adhere to a substrate to be applied, and then photo-setting the waterproof material in the adhesive state to simultaneously form a hard layer which functions as a fiber reinforced waterproof layer and a soft layer which functions as a buffer layer.

According to the waterproof material and the method for applying the waterproof layer of the present invention, the waterproof layer having high performances can be formed on the surface of a civil engineering works or a building in a short time of about 30 minutes by a few steps without polluting a working environment.

In addition, the waterproof layer, needless to say, has performances originally required for itself, i.e., water resistance, weathering resistance, substrate adhesion and aesthetic properties, and it further has a high surface hardness and so walking on the waterproof layer is possible after its application. Moreover, it is also excellent in high follow-up properties to cracks of an substrate.

DETAILED DESCRIPTION OF THE INVENTION

In this specification, a viscosity (η) of a resin composition (A) is a value [Pa·s (25° C.)] determined by placing a prepared resin composition in a circular can (volume =500 ml), allowing it to stand and age at 40° C. for 24 hours, cooling it to room temperature, and then carrying out measurement by the use of a viscometer [Brookfield type (BH type)].

Furthermore, (meth)acrylic acid, (meth)acrylate and (meth)acrylonitrile mean methacrylic acid and/or acrylic acid; methacrylate and/or acrylate; and methacrylonitrile and/or acrylonitrile, respectively.

Next, the present invention will be described in detail as follows.

I. In the first place, various materials which can be used in the present invention will be described.

1. Resin Composition (A)

The resin composition (A) contains a thermosetting resin (a), a photopolymerization initiator (b) and a thickener (c).

(1) Thermosetting Resin (a)

As the thermosetting resin (a), a radical polymerizable resin is preferable from the viewpoint of a curing rate and physical properties of a formed waterproof layer, and examples of the radical polymerizable resin include an unsaturated polyester resin, a vinyl ester resin and a vinylurethane resin.

(i) The unsaturated polyester resin can be prepared by a polycondensation of an α, β-unsaturated dibasic acid or its acid anhydride and a glycol, or in a certain case, it is preferably a thermosetting resin composition comprising a solution obtained by mixing 70 to 20 parts by weight of a polymerizable monomer with 30 to 80 parts by weight of an unsaturated polyester prepared by using an aromatic, an aliphatic or an alicyclic saturated dibasic acid or its acid anhydride as an acid component.

Here, examples of the α, β-unsaturated dibasic acid or its acid anhydride include maleic acid, maleic anhydride, fumaric acid, itaconic acid, citraconic acid, chloromaleic acid and esters thereof; examples of the aromatic saturated dibasic acid or its acid anhydride include phthalic acid, phthalic anhydride, isophthalic acid, terephthalic acid, nitrophthalic acid, tetrahydrophthalic anhydride, endomethylenetetrahydrophthalic anhydride, halogenated phthalic anhydrides and esters thereof; and examples of the aliphatic or the alicyclic saturated dibasic acid or its acid anhydride include oxalic acid, malonic acid, succinic acid, adipic acid, sebacic acid, azelaic acid, glutaric acid, hexahydrophthalic anhydride and esters thereof. They may be used singly or in the form of a mixture of two or more thereof.

Examples of the glycol include ethylene glycol, propylene glycol, diethylene glycol, dipropylene glycol, 1,3-butanediol, 1,4-butanediol, 2-methylpropane-1,3-butanediol, neopentyl glycol, triethylene glycol, tetraethylene glycol, 1,5-pentanediol, 1,6-hexanediol, bisphenol A propylene oxide adduct, bisphenol A ethylene oxide adduct, hydrogenated bisphenol A, ethylene glycol carbonate and 2,2-di-(4-hydroxypropoxydiphenyl)propane. They may be used singly or in the form of a mixture of two or more thereof. In addition thereto, oxides such as ethylene oxide (EO) and propylene oxide (PO) can also similarly be used.

As a part of the glycol and the acid component, a polycondensate such as polyethylene terephthalate can be used. Furthermore, there can also be used a resin obtained by reacting a terminal carboxyl group of an unsaturated alkyd resin synthesized from a glycol and an acid with a reactive monomer having a glycidyl group. An example of the reactive monomer having the glycidyl group is glycidyl (meth)acrylate.

(ii) A preferable example of the vinyl ester resin is a thermosetting resin composition comprising a solution obtained by mixing 70 to 20 parts by weight of a polymerizable monomer with 30 to 80 parts by weight of an epoxy vinyl ester obtained by modifying the terminal of an unsaturated polyester with a vinyl group, or an epoxy vinyl ester obtained by modifying the terminal of the epoxy skeleton of an epoxy resin with a vinyl group.

More concretely, the vinyl ester referred to herein is an epoxy vinyl ester obtained by reacting a single resin or a mixed resin of bisphenol type epoxy resins and novolak type epoxy resins having an average epoxy equivalent in the range of 150 to 450 g/eq with an unsaturated monobasic acid in the presence of an esterification catalyst.

Examples of the bisphenol type epoxy resins mentioned above include glycidyl ether type epoxy resins having substantially two or more epoxy groups in one molecule which can be obtained by reacting epichlorohydrin with bisphenol A or bisphenol F; dimethyl glycidyl ether type epoxy resins which can be obtained by reacting methylepichlorohydrin with bisphenol A or bisphenol F; and epoxy resins which can be obtained from an alkylene oxide adduct of bisphenol A and epichlorohydrin or methylepichlorohydrin.

Examples of the novolak type epoxy resins include epoxy resins obtained by reacting phenol novolak or cresol novolak with epichlorohydrin or methylepichlorohydrin.

Typical examples of the unsaturated monobasic acid include (meth)acrylic acid, cinnamic acid, crotonic acid, monomethyl malate, monopropyl malate, monobutyl malate, sorbic acid and mono(2-ethylhexyl) malate. They may be used singly or in the form of a mixture of two or more thereof.

(iii) The vinylurethane resin is preferably a thermosetting resin composition comprising a solution obtained by mixing 70 to 20 parts by weight of a polymerizable monomer with 30 to 80 parts by weight of a vinylurethane which can be obtained by reacting a compound having an isocyanate group at its terminal obtained by adding a polyisocyanate compound to a terminal hydroxyl group of a polyether polyol and/or a polyester polyol with a compound having both a hydroxyl group and a double bond in one molecule.

Here, examples of the polyether polyol include polypropylene glycol and polyethylene glycol having a number-average molecular weight of 400 to 4,000; an example of the polyester polyol is a polyester polyol having a hydroxyl group at its terminal obtained by reacting one or a mixture of maleic acid, fumaric acid, adipic acid and phthalic acid with one or a mixture of ethylene glycol, propylene glycol, diethylene glycol and dipropylene glycol; examples of the polyisocyanate compound include 2,4-tolylene diisocyanate, 2,6-tolylene diisocyanate, 4,4'-diphenylmethane diisocyanate and hexamethylene diisocyanate; examples of the compound having both the hydroxyl group and the double bond in one molecule include hydroxylethyl acrylate and hydroxylethyl methacrylate.

(iv) Examples of the polymerizable monomer for the above exemplified radical polymerizable resin include vinyl compounds such as styrene, vinyltoluene, α-methylstyrene, chlorostyrene, dichlorostyrene, vinylnaphthalene, ethyl vinyl ether, methyl vinyl ketone, methyl (meth)acrylate, ethyl (meth)acrylate and (meth)acrylonitrile; allyl compounds such as diallyl phthalate, diallyl fumarate, diallyl succinate and triallyl cyanurate; vinyl oligomers which are crosslinkable with an unsaturated polyester, a vinyl ester or a vinylurethane.

Above all, styrene is usually used. These polymerizable monomers may be used singly or in the form of a mixture of two or more thereof.

(2) Photopolymerization Initiator (b)

(i) Examples of the photopolymerization initiator (b) include benzophenone compounds: benzophenone, 4-chlorobenzophenone, 4-bromobenzophenone, 2-methylbenzophenone, 4-methylbenzophenone, β-naphthyl phenyl ketone, 2-benzoylthiophenone, methyl methyl-o-benzoylbenzoate, 2-benzoylpyridine and 2-hydroxy-2-methyl-1-phenylpropane-1-one, benzyl compounds: benzyl, 4-chlorobenzyl and 4-methylbenzyl, xanthone compounds: xanthone, 2-chloroxanthone and 2-isopropylxanthone, thioxanthone compounds: thioxanthone, 2-chlorothioxanthone, 2-methylthioxanthone and 2-isopropylthioxanthone, anthraquinone compounds: anthraquinone, 2-methylanthraquinone, 2-ethylanthraquinone, 1-chloroanthraquinone and 9-fluorene, acetophenone compounds: acetophenone, 4-methylacetophenone, 4-isopropylacetophenone, 4-chloroacetophenone, 2,2-dimethoxy-2-phenylacetophenone, 2,2-diethoxyacetophenone, 2,2,2-trichloro-4'-tert-butylacetophenone and 2,2-dichloro-4'-phenyloxyacetophenone, oxime compounds: 1-phenyl-1,2-propanedione-2-(o-benzoyl) oxime and 1-phenyl-1,2-propanedione-2-(o-ethoxycarbonyl) oxime, and acylphosphine oxide compounds: 2,6-dimethylbenzoyldiphenylphosphine oxide, 2,4,6-trimethylbenzoyldiphenylphosphine oxide, 2,4,6-trimethylbenzoyl-phenyl-phosphinic acid methyl ester, 2,6-dichlorobenzoyldiphenylphosphine oxide, bisacylphosphine oxide and mixtures thereof.

(ii) The amount of the photopolymerization initiator (b) to be used is in the range of 0.1 to 10 parts by weight, preferably 0.5 to 3 parts by weight based on 100 parts by weight of the thermosetting resin (a). If this amount is less than 0.1 part by weight, the resin composition is not sufficiently cured, and on the other hand, if it is more than 10 parts by weight, the strength of a cured substance and a gel fraction (a guide of the reaction) deteriorate, which is not preferable from the viewpoint of physical properties.

(3) Thickener (c)

(i) Examples of the thickener (c) include inorganic compounds such as magnesium oxide, magnesium hydroxide and calcium oxide; and isocyanate compounds such as xylene diisocyanate, tolylene diisocyanate and diphenylmethane diisocyanate; and aluminum chelate compounds such as ethyl acetoacetate aluminum diisopropylate, aluminum tris(ethyl acetoacetate), alkyl acetoacetate aluminum diisopropylate, aluminum monoacetyl acetonate bis(ethyl acetoacetate) and aluminum tris(acetyl acetonate).

(ii) The amount of the thickener (c) is usually in the range of 0.5 to 2 parts by weight based on 100 parts by weight of the thermosetting resin (a), but since thickening properties depend on the kind of the thermosetting resin (a), this amount is not always restricted.

2. Fiber Reinforced Material (B)

Examples of the fiber reinforced material (B) include glass fibers; organic fibers such as amides, aramids, vinylons, polyesters and phenols; carbon fibers, metallic fibers, ceramic fibers and combinations thereof. In view of applicability and economy, the glass fiber or the organic fiber is preferable.

The form of the fiber in the fiber reinforced material (B) may be a plain weave, a satin weave, a nonwoven fabric, a mat or the like, but above all, the mat is preferable from the viewpoints of applicability, the retention of thickness and the like. Furthermore, chopped strands obtained by cutting glass rovings into a length of 20 to 100 mm can also be used. In addition, the mat and the chopped strands can be used together.

3. Polymerization Diluent, Filler and the Like

In the present invention, a known polymerization diluent, a filler and the like can be used as needed, in addition to the above resin composition (A) and fiber reinforced material (B).

(1) Examples of the polymerization diluent include vinyl compounds such as styrene, vinyltoluene, vinylpyrrolidone, vinyl caprolactam and divinylbenzene; mono(meth)acrylate compounds such as butyl (meth)acrylate, benzyl (meth) acrylate, cyclohexyl (meth)acrylate, tetrahydrofurfuryl (meth)acrylate, isobornyl (meth)acrylate, dicyclopentenyl (meth)acrylate, phenoxyethyl (meth)acrylate, phenoxy EO-modified (meth)acrylate, phenoxy PO-modified (meth) acrylate, nonylphenoxy EO-modified (meth)acrylate and nonylphenoxy PO-modified (meth)acrylate; polyvalent (meth)acrylate compounds such as 1,6-hexanediol diacrylate, trimethylolpropane triacrylate, pentaerythritol triacrylate and dipentaerythritol hexaacrylate; ethylene oxide-modified (meth)acrylate, propylene oxide-modified (meth)acrylate, (meth)acrylate of polyethylene glycol and (meth)acrylate of polypropylene glycol.

The amount of the polymerization diluent is preferably in the range of 0 to 30 parts by weight based on 100 parts by weight of the thermosetting resin (a), and if it is in excess of 30 parts by weight, the regulation of a viscosity is difficult.

(2) Examples of the filler include aluminum hydroxide, calcium carbonate, calcium hydroxide, glass powder and glass beads. In order to smoothly advance the photo-setting reaction, the filler having a high transparency is preferable. The amount of the filler to be used is preferably in the range of 0 to 150 parts by weight based on 100 parts by weight of the thermosetting resin (a). If the amount of the filler is more than 150 parts by weight, the composite blend of the filler with the fiber reinforced material is difficult, so that tensile strength noticeably deteriorates.

II. In the second place, a waterproof material and a waterproof application method using the same according to the present invention will be described.

II-1. Waterproof Material (X)

As one typical waterproof material of the present invention, a photo-setting sheet-like waterproof material comprising the resin composition (A) and the fiber reinforced material (B) will be described. Concretely, the waterproof material is preferably a sheet having a total thickness of 0.5 to 5.0 mm, preferably 1.0 to 5.0 mm made from a photo-setting fiber reinforced thermosetting resin composition (C) [hereinafter abbreviated to "the resin composition (C)" on occasion] obtained by blending 50 to 97 parts by weight of a resin composition (A) containing the thermosetting resin (a), the photopolymerization initiator (b) and the thickener (c) with 50 to 3 parts by weight of the fiber reinforced material (B).

With regard to the blend of the resin composition (A) with the fiber reinforced material (B), if the amount of the fiber reinforced material (B) is less than 3 parts by weight based on 100 parts of the thermosetting resin (a), the cure shrinkage of the obtained waterproof material is large, so that cracks are liable to occur in the waterproof layer. Conversely, if the amount is more than 50 parts by weight, a glassy phase appears on the surface of the waterproof layer, which is not preferable from the viewpoint of its appearance.

On the other hand, if the total thickness of the sheet is less than 0.5 mm, a desired strength which withstands walking thereon can scarcely be obtained, and if it is more than 5.0 mm, the curing by light irradiation is insufficient, so that the under part of the sheet is not completely cured. In addition, the sheet itself warps due to the cure shrinkage.

Particularly in view of the application work, the waterproof material of the present invention is required to possess two contrary properties of softness and hardness which are directly concerned with adhesive properties with a waterproof substrate, i.e., a substrate and a mounting workability. Here, the mounting workability means a performance of the waterproof material which does not give rise to an appearance defect such as the print of a footmark on the surface of the waterproof material and the transfer of a shape of a rolling tool such as a roller, when a worker directly mounts on the uncured waterproof material to spread and roll the waterproof material on the substrate.

One typical waterproof material of the present invention is constituted of two layers comprising two kinds of resin composition ($A_1$) and resin composition ($A_2$) which are the same or different in viscosity as follows. That is to say, it is preferred that a viscosity ($\eta_1$) of a resin composition ($A_1$) constituting a soft layer which comes in contact with the substrate is in the range of $10^2$ to $10^5$ Pa·s (25° C.), and a viscosity ($\eta_2$) of a resin composition ($A_2$) constituting a hard layer which is exposed to the atmosphere is in the range of $10^3$ to $10^6$ Pa·s (25° C.).

Here, both of the viscosity ($\eta_1$) of the resin composition ($A_1$) and the viscosity ($\eta_2$) of the resin composition ($A_2$) are preferably in the range of $10^3$ to $10^5$ Pa·s (25° C.) (however $\eta_1 \leq \eta_2$).

An occupation ratio of the hard layer in the thickness direction of this waterproof material is preferably 10%<the hard layer/(the soft layer+the hard layer)<85%.

In the present invention, if the viscosity ($\eta_1$) of the resin composition ($A_1$) is less than $10^2$ Pa·s, the peeling properties of a light shielding film noticeably decline, and if it is more than $10^5$ Pa·s, the adhesive properties between the waterproof material and the substrate noticeably deteriorate.

On the other hand, if the viscosity ($\eta_2$) of the resin composition ($A_2$) is less than $10^3$ Pa·s, the mounting workability at the waterproof application is poor, and if it is more than $10^6$ Pa·s, a rolling pressure at the rolling operation does not reach a portion between the waterproof material and the substrate, so that an insufficient adhesive state is liable to occur. In addition thereto, in the case that the waterproof application surface of the substrate is poor in smoothness, the waterproof material cannot follow the rough surface of the substrate, so that non-adhesive portions tend to be present between the waterproof material and the substrate.

Furthermore, even if each of $\eta_1$ and $\eta_2$ is in the range of $10^3$ to $10^5$ Pa·s, in the case of $\eta_1 > \eta_2$, wrinkles easily appear on the surface of the cured resin composition, which is not preferable from the viewpoint of appearance.

Preparation method of the waterproof material

Figure 1:
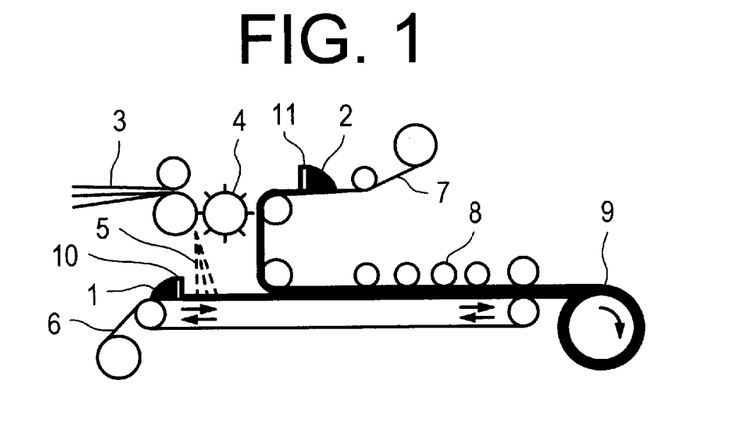
FIG. 1 is a schematic process view showing a preparation method (using an SMC impregnating machine) of a typical waterproof material according to the present invention.
Figure 2:
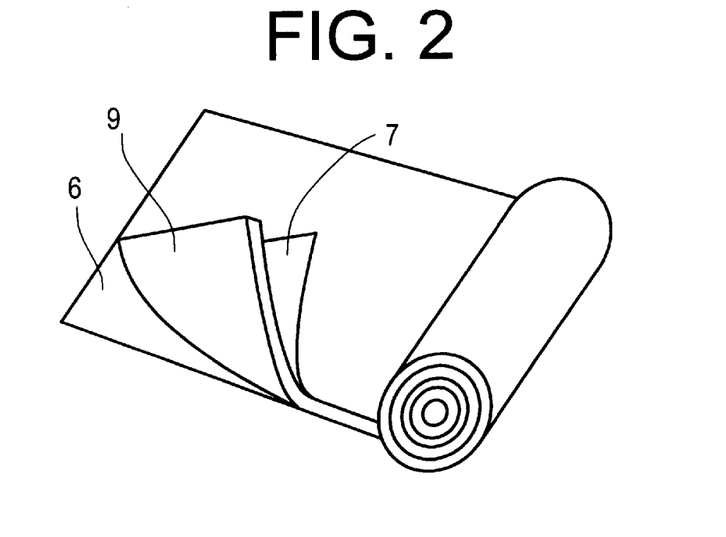
FIG. 2 is a perspective view showing the waterproof material of the present invention according to the preparation method of FIG. 1.

A typical preparation method of the waterproof material according to the present invention utilizes a sheet molding compound (hereinafter abbreviated to "SMC") impregnating machine, and an example of this method will be described with reference to FIGS. 1 and 2.

As described above, two kinds of resin composition ($A_1$) 1 and resin composition ($A_2$) 2 having predetermined viscosities, respectively, are previously prepared. These resin composition ($A_1$) 1 and resin composition ($A_2$) 2 and a fiber reinforced material (B), i.e., chopped strands 5 obtained by cutting glass rovings 3 with a chopper 4 are fed in a predetermined ratio between a lower light shielding film 6 and an upper light shielding film 7 which are continuously wound up. Next, the chopped strands 5 are impregnated with the resin composition ($A_1$) 1 and the resin composition ($A_2$) 2 to obtain a waterproof material 9 of a two-layer structure having a predetermined thickness. In this case, the total thickness of the waterproof material 9, i.e., the thickness of the soft layer [comprising the resin composition ($A_1$)] and the hard layer [comprising the resin composition ($A_2$)] can be regulated by a doctor blade 10 and a doctor blade 11, respectively.

The thus obtained waterproof material of the present invention has the form of a two-layer sheet, and both the surfaces of the waterproof material are preferably with the light shielding films 6, 7.

Waterproof Application Method

Figure 3:
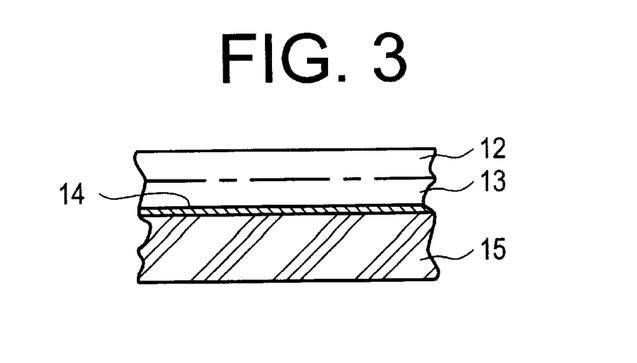
FIG. 3 is a sectional view showing one embodiment of a structure to which the waterproof material of the present invention has been applied.

A waterproof application method using the above waterproof material will be described with reference to FIGS. 2 and 3. That is to say, the light shielding film 6 alone on the soft layer (which will come in contact with the substrate) of the waterproof material is peeled therefrom, and the waterproof material is spread on the substrate 15 directly or via a primer layer 14 so that the soft layer may come in contact with the substrate 15. Afterward, the waterproof material is pressed by a roller or the like. Next, the light shielding film 7 on the hard layer (which will be exposed to the atmosphere) of the waterproof material is peeled therefrom, and then cured with the sunlight or the like to form a waterproof layer on the substrate.

Here, as the primer layer 14, there can be used a known primer such as a one-pack type moisture-setting urethane resin, a two-pack type urethane resin, an epoxy resin or an unsaturated polyester resin.

In the case that the primer layer is present on the substrate 15, a structure formed by the waterproof application is constituted of a buffer layer 13 comprising the soft layer via the primer layer 14 and a waterproof layer 12 comprising the hard layer.

Since the waterproof material of the present invention is a photo-setting type, the sheet layer of the resin composition (C) can be cured by a known light irradiation technique, for example, by the use of the sunlight, an ultraviolet light of 200 to 800 nm, a visible light or the like at the time of the waterproof application. In the case of the sunlight, the waterproof material can be cured in a short time of about 30 minutes to form the waterproof layer.

The curing is scarcely affected by the temperature and the weather (irradiation dose), and for example, within the temperature range of about 10 to 30° C., the waterproof material can be completely cured to its under part in a similar time even by the use of the sunlight having an irradiation dose of about 10 watt/m$^2$ (a cloudy sky). In this connection, with regard to a conventional FRP waterproof material, its curing time is largely affected by the temperature, because the FRP waterproof material is a thermosetting type. For example, between temperatures of 10° C. and 30° C., the curing rate changes about 10 times. In the waterproof material of the present invention, it is preferable that both the surfaces of the waterproof material are protected with the light shielding films so as to control the start of the photopolymerization reaction until the waterproof application.

During the spreadrolling of the waterproof material in the waterproof application of the present invention, the volatilization of the solvent and the polymerizable monomer in the waterproof material can be remarkably restrained by the remaining light shielding film exposed to the atmosphere, and even after the light shielding film is peeled, the volatilization of the polymerizable monomer can be sufficiently controlled, because the curing is promptly done from the surface layer of the waterproof material. In order to further control the volatilization of the polymerizable monomer, another film which can transmit the sunlight or the like may be arranged between the waterproof material and the light shielding film exposed to the atmosphere, and the light transmittable film may be kept up at the time of the curing with the sunlight or the like, and after the curing, the film may be peeled.

Since the fiber reinforced material is previously contained in the waterproof material of the present invention, there is, needless to say, no problem that the chips of the fiber reinforced material are scattered during the waterproof application, in contrast to a usual waterproof application in which the fiber reinforced material is cut and then laminated on the resin layer in succession.

Furthermore, when conventional synthetic polymer sheets are used, a step appears at each joint portion of the sheets at the waterproof application, but in the case of the waterproof material according to the present invention, the lap disappears by the rolling operation, so that such a flat finish as in a film waterproofing can be obtained. That is to say, the present invention is also excellent in aesthetic properties.

II-2. Waterproof Material (Y)

Next, reference will be made to another typical waterproof material of the present invention which can be obtained by integrally laminating the photo-setting fiber reinforced thermosetting resin composition (C) and the synthetic polymer sheet layer (D) on each other, and a waterproof application method using the waterproof material.

As the resin composition (C), about the same composition as the resin composition ($A_2$) in the above waterproof material can usually be employed, and the resin composition (C) corresponds to the hard layer of the photo-setting sheet-like waterproof material comprising the resin composition (A) and the fiber reinforced material (B) which is formed by, for example, the same method as described with reference to FIG. 1 except that the resin composition ($A_1$) is omitted.

Waterproof Material

A material of the above synthetic polymer sheet layer (D) is preferably a homogeneous sheet and a composite sheet which can meet JIS-A-6008 (synthetic polymer roofing sheets), but the thickness of the sheet is not particularly limited. Among the materials covered by this stipulation, there can be used the sheets of vulcanized rubbers such as butyl rubber, ethylenepropylene rubber and chlorosulfonated polyethylene; vinyl chloride resins such as vinyl chloride resin and vinyl chloride copolymer; and an ethylene-vinyl acetate resin such as ethylene-vinyl acetate copolymer.

In addition to the above sheets, urethane sheets are also preferable, and the urethane sheets having a tensile elongation of more than 100% can be used.

The synthetic polymer sheet layer (D) has holes. The area of these holes is in the range of 2 to 80%, preferably 10 to 50% based on the whole area of the synthetic polymer sheet layer (D). If the area of the holes is less than 2%, an adhesive force to the substrate is poor, so that the waterproof layer is liable to be peeled off by wind pressure, and if it is more than 80%, follow-up properties to cracks of the substrate tend to be insufficient.

Furthermore, no particular restriction is put on the shape of the holes, but it is preferred that the holes each having an area of $10^{-4}$ to $10^{-1}$ of all the holes are regularly present in a unit area of the sheet.

If the area of each hole is less than $10^{-4}$, a rolling pressure is scarcely transmitted to an interface between the sheet layer (D) and the substrate, so that the adhesive force to the substrate is poor and the sheet layer (D) is liable to be peeled off, and if it is more than $10^{-1}$, the waterproof layer tends to locally break to the cracks of the substrate.

Here, the above regular arrangement of the holes can usually exert an excellent vent effect, but even if the holes are irregularly arranged, this effect is not lost.

The thickness of the synthetic polymer sheet layer (D) is in the range of 0.1 to 5.0 mm, preferably 0.5 to 2.5 mm. If this thickness is less than 0.1 mm, the sheet layer (D) is liable to break by a tensile load at the waterproof application and a scratch caused by a protrusion of the substrate, and if it is more than 5.0 mm, the sheet layer (D) can not follow the rough surface of the substrate, so that wrinkles appear on the waterproof layer inconveniently.

Preparation method of the waterproof material

Figure 4:
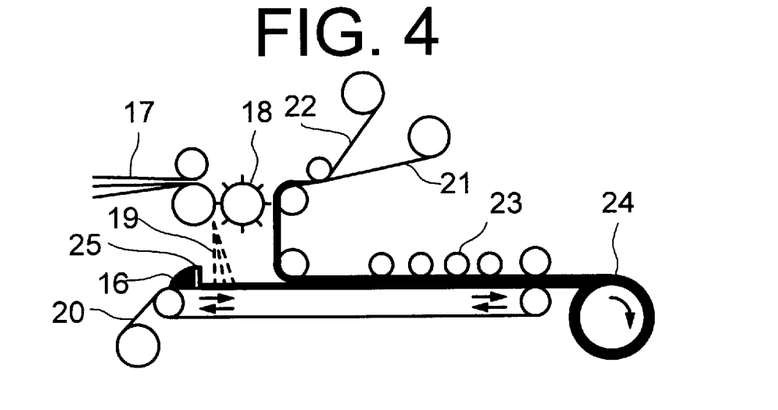
FIG. 4 is a schematic process view showing a preparation method (using the SMC impregnating machine) of another typical waterproof material according to the present invention.
Figure 5:
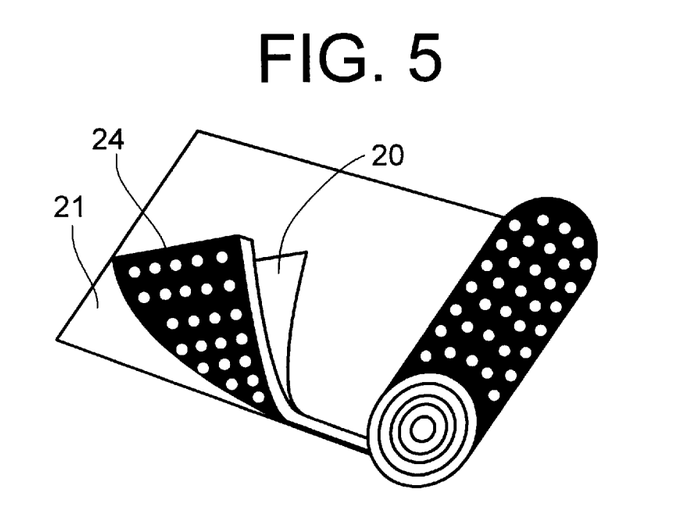
FIG. 5 is a perspective view showing the waterproof material of the present invention according to the preparation method of FIG. 4.

A typical preparation method of this waterproof material utilizes an SMC impregnating machine, and an example of this method will be described with reference to FIGS. 4 and 5.

The previously prepared resin composition ($A_2$) 16 and chopped strands 19 obtained by cutting glass rovings 17 with a chopper 18 are fed in a predetermined ratio between a lower light shielding film 20 and an upper light shielding film 21 laminated on a synthetic sheet 22 which are continuously wound up. Next, the chopped strands are impregnated with the resin composition ($A_2$) by a compression roller 23 to obtain a waterproof material 24 of a two-layer structure having a predetermined thickness. In this case, the total thickness of the waterproof material can be regulated by the thickness of the synthetic polymer sheet and a doctor blade 25. The thus obtained waterproof material of the present invention has the form of a two-layer sheet, and both the surfaces of the waterproof material are protected with the light shielding films.

Alternatively, the waterproof material can also be obtained by integrally adhering the sheet layer of the previously prepared photo-setting fiber reinforced thermosetting resin composition (C) on the synthetic polymer sheet layer (D).

Both the surfaces of the waterproof material obtained at this time are required to be protected with the light shielding films so as to control the start of the photopolymerization reaction until the step of the waterproof application.

Waterproof application method

Figure 6:
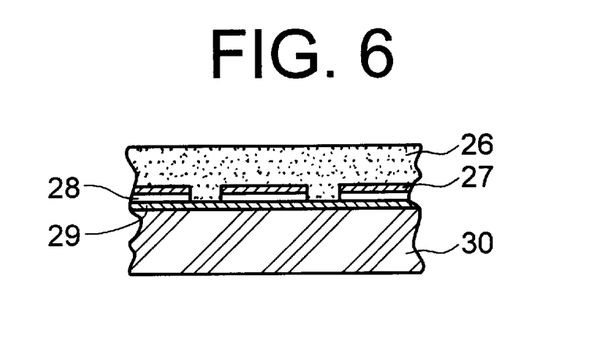
FIG. 6 is a sectional view showing one embodiment of another structure to which the waterproof material of the present invention has been applied.

A waterproof application method using the thus prepared waterproof material of the present invention will be described with reference to FIGS. 5 and 6.

The light shielding film 21 on the side of the synthetic polymer sheet layer (D) is peeled, and the waterproof material is spread on the waterproof substrate (substrate) 30 directly or via a primer layer so that the synthetic polymer sheet layer (D) may come in contact with the substrate 30. After the waterproof material is pressed, the light shielding film 20 is peeled and the photopolymerization reaction is then started, whereby a waterproof layer can be formed in a short period of time.

As the primer layer, there can be used a known primer such as a one-pack type moisture-setting urethane resin, a two-pack type urethane resin, an epoxy resin or an unsaturated polyester resin.

In the case that the primer layer 29 is present on the substrate 30, a structure formed by the waterproof application is constituted of an aeration layer 28 and a buffer layer 27 comprising the synthetic polymer sheet layer on the substrate 30, and a waterproof layer 26 comprising the hard layer on the buffer layer 27.

The formed waterproof layer has performances peculiar to the waterproof layer such as water resistance, anticorrosion, weathering resistance, adhesive properties to the substrate and follow-up properties to substrate cracks, and the surface hardness of the waterproof layer is so high that a worker can walk thereon.

Furthermore, the waterproof layer can be provided with a deaeration function. That is to say, a deaeration tower can be installed at a certain position of the waterproof layer by utilizing non-adhesive portions as ventilation space between the synthetic polymer sheet layer (D) and the surface of the substrate, whereby water vapor generated from the substrate can be removed.

In addition, when conventional synthetic polymer sheets are used, a step appears at each joint portion of the sheets at the waterproof application, but in the case of the waterproof material according to the present invention, the lap disappears by the rolling operation, so that such a flat finish as in a film waterproofing can be obtained, which means that the waterproof material of the present invention is also excellent in aesthetic properties.

II-3. Waterproof material (Z)

As a still another typical waterproof material of the present invention, there can be provided a photo-setting sheet-like waterproof material which is obtainable by densely dispersing a fiber reinforced material (B) in a surface layer of a resin composition (A) containing a thermosetting resin, a photopolymerization initiator and a thickener to form a hard layer, and loosely dispersing the fiber reinforced material (B) in a back surface layer of the resin composition (A) to form a soft layer.

No particular restriction is put on a typical method of densely dispersing the fiber reinforced material (B) in the surface layer of the resin composition (A) and loosely dispersing the fiber reinforced material (B) in the back surface layer of the resin composition (A), but an easily practicable method comprises forming a photo-setting fiber reinforced thermosetting resin sheets having different contents of the fiber reinforced material (B), and then integrally laminating them in a suitable number of the layers so that the sheet in which the fiber reinforced material (B) is densely dispersed may be a surface layer and so that the sheet in which the fiber reinforced material (B) is loosely dispersed may be a back surface layer.

In this method, no particular restriction is put on the form of the fiber reinforced material (B), but a woven fabric or a mat is preferable.

Here, in the sheet-like waterproof material comprising at least two layers in which the photo-setting fiber reinforced thermosetting resin composition layer (C) having different contents of the fiber reinforced material (B) are laminated, a difference of physical properties between the hard layer and the soft layer tends to be small, and follow-up properties to substrate cracks of the waterproof layer after the waterproof application are scarcely constant. Thus, the preferable waterproof materials are (1) a sheet-like waterproof material constituted of 2 layers comprising two kinds of photo-setting fiber reinforced thermosetting resin compositions ($A_1$ and $A_2$) which are the same or different in viscosity and the fiber reinforced material (B), and (2) a sheet-like waterproof material obtained by integrally laminating the photo-setting fiber reinforced thermosetting resin composition layer (C) and the synthetic polymer sheet layer (D) on each other.

Next, the present invention will be described in more detail with reference to preparation examples, reference examples and comparative examples, but the scope of the present invention should not be limited by these examples. In the following, "part(s)" means "part(s) by weight", unless otherwise specified.

Test Methods

Waterproof materials and test pieces obtained in the examples and the comparative examples were evaluated by the following test methods. The results are shown in Tables 2 to 6.

(1) Adhesive force: A waterproof layer was applied onto a concrete plate having a size (300 mm×300 mm×60 mm) stipulated by JIS-A-5304 (concrete flags) to form a test piece, and this test piece was then allowed to stand under an atmosphere of 20° C. and a relative humidity of 65% for one week. Next, a cut was made in the test piece, and a stainless steel jig (40 mm×40 mm) was then stuck on the test piece by an epoxy adhesive. Afterward, a test was done at 20° C. at a loading rate of about 1 $kgf/cm^2$/sec by the use of a KENCHIKU KENKYUSHO type adhesive tester to measure the adhesive force ($kgf/cm^2$).

(2) Fatigue test: A fatigue test of a test piece was measured conform to fatigue test conditions described in Japanese Architectural Standard Specification JASS8 Waterproofing and Sealing (hereinafter abbreviated to JASS8). The measurement was carried out from a step 1 (movement 0.5←1.0 mm) to a step 3 (movement 2.5←5.0 mm) by using an A type test piece as the test piece and a hydraulic servo building finish material fatigue tester (made by Saginomiya Seisakusho Inc.) as a tester. The test results were represented on the basis of the following classification.

Classification of the A type test pieces

A1: The test piece broke in the step 1

A2: The test piece broke in the step 2

A3: The test piece broke in the step 3

A4: The test piece did not break in the step 3

(3) Surface hardness: The surface hardness of a test piece which denoted a maximum value was measured by the use of a Shore durometer.

(4) Recess resistance: A load of 30 kg was applied to a test piece at an atmospheric temperature of 40° C. according to a recess test of JASS8 to inspect whether or not a waterproof layer of the test piece was broken.

(5) Impact resistance: A steel ball of 5 kg was dropped at an atmospheric temperature of 40° C. from a height of 1.5 m according to an impact resistance test of JASS8 to inspect whether or not a waterproof layer of a test piece was broken.

(6) Waterproof application time: As the waterproof application time, there was measured a time of from the start point of a waterproof application using a waterproof material to the attainment of the maximum value of a surface hardness of an obtained test piece. In this connection, in Examples 1 to 6 and Referential Examples 1 to 7, this application time substantially corresponds to the so-called curing time.

(7) Mounting workability: During an operation of from a waterproof material to a test piece, a metallic cone (weight=5 kg, bottom area=20 $cm^2$) was put on the surface of a waterproof layer for 30 seconds prior to curing with the sunlight. After the metallic cone was removed, a depth (mm) of a recess on the test piece surface was measured, and evaluation was then made on the basis of the following three grades.

○: less than 0.05 mm, Δ: 0.05 to 0.10 mm, X: more than 0.10 mm (8) Concentration of volatilized styrene: A styrene concentration (ppm) which denoted a maximum value at a position of a height of 10 cm above a substrate was measured as the concentration of volatilized styrene by the use of a Kitagawa type gas detecting tube during a period of from a waterproof material to the preparation of a test piece.

(9) Surface appearance: A surface appearance of an obtained test piece was visually observed.

(10) Undercoat crack resistance: A waterproof layer was applied onto an asbestos slate in accordance with a test method (KMK method: Housing and Urban Development Corporation) of a liquid-applied compounds for waterproofing membrane coating to form a test piece, and elongation, strength and peel width were then measured by the use of a Shimadzu autograph (AG-10TD, made by Shimadzu Seisakusho Ltd.).

(11) Blister resistance: A waterproof layer was applied onto a concrete stipulated by JIS in accordance with a flags test of JASS8 to form a test piece, and the blister resistance of the test piece was then measured.

The test results were represented on the basis of the following classification.

Classification

Blister 1: The test piece abnormally blistered within 10 minutes under a pressure of 10.0 kPa (0.102 kgf/cm$^2$)

Blister 2: The test piece abnormally blistered within 10 minutes under a pressure of 20.0 kPa (0.204 kgf/cm$^2$)

Blister 3: The test piece abnormally blistered within 10 minutes under a pressure of 50.0 kPa (0.510 kgf/cm$^2$)

Blister 4: No abnormal generation under a pressure of 50.0 kPa (0.510 kgf/cm$^2$)

(12) Bierbaum scratch hardness: A waterproof material was cured in a predetermined manner (exposed to the sunlight for 30 minutes) in accordance with a procedure described in ASTM D-1526-58T, and a hardness $H_{S1}$ of the surface of a soft layer and a hardness $H_{H1}$ of the surface of a hard layer were then measured by a Bierbaum scratch hardness test method.

Further more, both the layers were planed so that the thickness of each layer might be ½, and a hardness $H_{S2}$ of the soft layer and a hardness $H_{H2}$ of the hard layer were then measured.

PREPARATION EXAMPLE 1

[Preparation of resin composition (A-1)]

100 parts of unsaturated polyester resin (trade name Ester WP260, made by Mitsui Toatsu Chemicals, Inc.), 1.0 part of a mixture of 2-hydroxy-2-methyl-1-phenylpropane-1-one and bisacrylphosphine oxide [a photopolymerization initiator, trade name Irgacure 1700, made by Novartis AG (Japan)] and 0.5 part of a thickener (magnesium oxide) were uniformly stirred by a mixer, thereby preparing a resin composition (A-1).

Table 1 shows a composition of components and a measured viscosity [Pa·s (25° C.)] of the resin composition.

PREPARATION EXAMPLES 2 to 6

[Preparation of resin compositions (A-2) to (A-6)]

The same procedure as in Preparation Example 1 was conducted except that the amounts of a thickener (magnesium oxide) and a filler (aluminum hydroxide) were changed as described in Table 1, thereby preparing 5 kinds of resin compositions (A-2) to (A-6).

Table 1 shows measured viscosities [Pa·s (25° C.)] of the resin compositions.

TABLE 1

| Resin Composition | Composition unit = part(s) | | | | | |
|---|---|---|---|---|---|---|
| | A-1 | A-2 | A-3 | A-4 | A-5 | A-6 |
| Unsaturated polyester resin | 100 | 100 | 100 | 100 | 100 | 100 |
| Photopolymerization initiator | 1.0 | 1.0 | 1.0 | 1.0 | 1.0 | 1.0 |
| Magnesium oxide | 0.5 | 0.8 | 1.0 | 1.0 | 2.0 | 3.0 |
| Aluminum hydroxide | — | — | — | 100 | 100 | 200 |
| Viscosity (Pa · s) | $8 \times 10$ | $4 \times 10^2$ | $5 \times 10^3$ | $7 \times 10^4$ | $8 \times 10^5$ | $2 \times 10^6$ |

EXAMPLE 1

(Preparation of a waterproof material)

28 parts of a resin composition (A-3) obtained in the above preparation example, 57 parts of a resin composition (A-4) and 15 parts of a fiber reinforced material (glass rovings, cut length=50 mm, made by Asahi Fiber Glass Co., Ltd.) were fed between two light shielding films (polyester laminate aluminum foils, made by Hosokawa Youkou Co., Ltd.) to prepare a sheet-like two-layer waterproof material. With regard to the thickness of the waterproof material, the thickness of a soft layer comprising (A-3) was 0.5 mm, that of a hard layer comprising (A-4) was 1.0 mm, and a total thickness was 1.5 mm. Furthermore, both the surfaces of the waterproof material were protected with the light shielding films. Afterward, the waterproof material was allowed to stand and age in a thermostatic chamber (40° C.) for 24 hours.

Next, the light shielding film on the side of the soft layer of the waterproof material was peeled off, and the waterproof material was spread on a substrate (a concrete plate or a asbestos cement slate) so that the exposed soft layer might come in contact with the substrate, and then pressed by a roller. Afterward, the light shielding film on the side of the hard layer of the waterproof material was peeled off, and the waterproof material was then cured with the sunlight to obtain a test piece in which a waterproof layer was formed on the substrate.

EXAMPLES 2 to 6

(Preparation of waterproof materials)

The same procedure as in Example 1 was conducted except that a viscosity and a thickness of a soft layer and a hard layer of each resin composition obtained in the above preference examples and an amount of a fiber reinforced material were altered in predetermined ranges as shown in Table 2, thereby obtaining waterproof materials and test pieces, and they were then tested.

As a result, waterproof layers were obtained in which an adhesive strength was good, a surface hardness was high, a waterproof application time was short, a topcoating workability was good, a styrene diffusion concentration was low and so an odor was slight, and a surface appearance was good, as shown in Table 2.

REFERENCE EXAMPLE 1

(In the case that the thickness of a hard layer was thicker than a predetermined preferable thickness of 7.0 mm)

The same procedure as in Example 1 was conducted except that a soft layer and a hard layer of each resin composition obtained in the above preference examples were set to predetermined viscosities, respectively, and the thickness of the soft layer was set to a predetermined thickness, and the thickness of the hard layer was set to a thickness of 7.0 mm which was thicker than a predetermined value as shown in Table 3, thereby obtaining a waterproof material and a test piece, and they were then tested.

As a result, since the thickness of the hard layer was 7.0 mm which was thicker than the predetermined value, curing with the sunlight was insufficient, so that the inside of the sheet was not completely cured. Hence, curing shrinkage occurred, and wrinkles appeared on the surface of the sheet, and warping also took place. In consequence, the waterproof layer broke at a step 1 (movement 0.5←1.0 mm), so that a performance as the waterproof layer could not be obtained.

REFERENCE EXAMPLE 2
(In the case that a material having a viscosity lower than a preferable viscosity was used as a soft layer)

The same procedure as in Example 1 was conducted except that a material having a viscosity lower than a predetermined value was used for a soft layer of a resin composition obtained in the above reference example, the viscosity of a hard layer was set to the predetermined value, and thickness and the amount of a fiber reinforced material were set to predetermined ranges as shown in Table 3, obtaining a waterproof material and a test piece, and they were then tested.

As a result, since the material having the viscosity lower than the predetermined value was used for the soft layer of the resin composition, the release properties of a light shielding film was poor, so that it could not be used.

REFERENCE EXAMPLE 3
(In the case that the thickness of a hard layer was set to 0.1 mm which was thinner than a preferable thickness)

The same procedure as in Example 1 was conducted except that a soft layer and a hard layer of a resin composition obtained in the above preference example were each set to a predetermined viscosity, the soft layer was set to a predetermined thickness, and the thickness of the hard layer was set to 0.1 mm which was thinner than the predetermined value as shown in Table 3, thereby obtaining a waterproof material and a test piece, and they were then tested.

As a result, since the hard layer was thin, footmarks were printed on the surface, so that the surface became a rough state. In consequence, the appearance of the waterproof layer was bad.

REFERENCE EXAMPLE 4
(In the case that a material having a viscosity higher than a preferable viscosity was used for a hard layer)

The same procedure as in Example 1 was conducted except that for a soft layer of a resin composition obtained in the above preparation example, a material having a predetermined viscosity was used, and for a hard layer, a material having a viscosity higher than the predetermined value was used, and thickness and the amount of a fiber reinforced material were set to predetermined ranges as shown in Table 3, obtaining a waterproof material and a test piece, and they were then tested.

As a result, since the material having the viscosity higher than the predetermined value was used for the hard layer of the resin composition, a rolling force at the time of a rolling operation did scarcely attain to an interface between the waterproof material and a substrate, and an adhesive force was as low as 15 kgf/cm$^2$, and unadhesive portions were present between the waterproof material and the substrate.

REFERENCE EXAMPLE 5
(In the case that a material having a viscosity lower than a preferable viscosity was used for a hard layer)

The same procedure as in Example 1 was conducted except that a soft layer of a resin composition obtained in the above preparation example was set to a predetermined viscosity, and for a hard layer, a material having a viscosity lower than the predetermined value was used, and thickness and the amount of a fiber reinforced material were set to predetermined ranges as shown in Table 3, obtaining a waterproof material and a test piece, and they were then tested.

As a result, since the material having the viscosity lower than the predetermined value was used for the hard layer of the resin composition, a mounting workability at the time of a waterproof application was poor, and when a worker was mounted on the surface of the sheet, the surface became rough, so that a surface appearance was bad.

REFERENCE EXAMPLE 6
(In the case that a resin composition/a fiber reinforced material (a weight ratio) was more than a preferable range)

The same procedure as in Example 1 was conducted except that a soft layer and a hard layer of a resin composition obtained in the above preparation example were each set to a predetermined viscosity and thickness, and the resin composition/a fiber reinforced material (a weight ratio) was 92/8 which was outside a predetermined range as shown in Table 4, thereby obtaining a waterproof material and a test piece, and they were tested.

As a result, the resin composition/the fiber reinforced material (a weight ratio) was 92/8, and therefore the amount of the fiber reinforced material was less than 3 parts by weight of a predetermined value. In consequence, curing shrinkage occurred, and wrinkles appeared on the surface of the sheet.

REFERENCE EXAMPLE 7
[In the case that a resin composition/a fiber reinforced material (a weight ratio) was less than a preferable range]

The same procedure as in Example 1 was conducted except that a soft layer and a hard layer of a resin composition obtained in the above preparation example were each set to a predetermined viscosity and thickness, and the resin composition/a fiber reinforced material (a weight ratio) was 45/55 which was outside a predetermined range as shown in Table 4, thereby obtaining a waterproof material and a test piece, and they were tested.

As a result, the resin composition/the fiber reinforced material (a weight ratio) was 45/55, and therefore the amount of the fiber reinforced material was more than 50 parts by weight of a predetermined value. In consequence, fiber glass appeared on the surface of the waterproof layer, which was not preferable from the viewpoint of an appearance.

COMPARATIVE EXAMPLE 1
(In the case of an FRP coating waterproof material)

A test piece having an FRP waterproof material was prepared by a Rimaster-RB-1 method (made by Mitsui Toatsu Chemicals, Inc.), and it was then tested.

As a result, a waterproof application time was as long as 4 hours owing to a coating waterproof operation by an in-situ application, and a styrene odor was strong. Moreover, also in a fatigue test, the waterproof layer broke in a step 1, which indicated that its performance still had room for improvement.

COMPARATIVE EXAMPLE 2

(In the case of a vinyl chloride sheet waterproof material)

A test piece having a vinyl chloride sheet waterproof material was prepared, and it was then tested.

As a result, an adhesive force to a substrate was 10 kgf/cm$^2$ which was much lower as compared with Examples 1 to 5, and a surface hardness was also as low as 15 Shore D. Therefore, the test piece was good for nonwalking, but it could not be used for walking.

TABLE 2

|  |  | Example |  |  |  |  |  |
|---|---|---|---|---|---|---|---|
|  |  | 1 | 2 | 3 | 4 | 5 | 6 |
| Resin composition: | Soft layer | A-3 | A-2 | A-3 | A-2 | A-3 | A-3 |
|  | Hard layer | A-4 | A-5 | A-5 | A-3 | A-4 | A-3 |
| Thickness (min): | Soft layer | 0.5 | 0.5 | 5.0 | 2.0 | 0.5 | 1.0 |
|  | Hard layer | 1.0 | 1.5 | 1.0 | 1.0 | 1.0 | 1.0 |
|  |  | (67%) | (75%) | (17%) | (33%) | (67%) | (50%) |
|  | Total | 1.5 | 2.0 | 6.0 | 3.0 | 1.5 | 2.0 |
| Viscosity of soft layer (Pa · s) |  | $5 \times 10^3$ | $4 \times 10^2$ | $5 \times 10^3$ | $4 \times 10^2$ | $5 \times 10^3$ | $5 \times 10^3$ |
| Viscosity of hard layer (Pa · s) |  | $7 \times 10^4$ | $8 \times 10^5$ | $8 \times 10^5$ | $5 \times 10^3$ | $7 \times 10^4$ | $5 \times 10^3$ |
| Resin composition/fiber reinforced material (wt ratio) |  | 85/15 | 80/20 | 95/5 | 55/45 | 85/15 | 80/20 |
| Primer layer |  | Absent | Absent | Absent | Absent | Present | Absent |
| Adhesive force (kgf/cm$^2$) |  | 21 | 25 | 21 | 25 | 21 | 21 |
| Fatigue test (fatigue) |  | A2 | A2 | A2 | A2 | A2 | A2 |
| Surface hardness (Shore D) |  | 85 | 85 | 85 | 85 | 85 | 85 |
| Recess resistance |  | No break | No break | No break | No break | No break | No break |
| Impact resistance |  | No break | No break | No break | No break | No break | No break |
| Application time (hrs) |  | 0.5 | 0.5 | 0.7 | 0.6 | 0.5 | 0.5 |
| Mounting workability |  | ◯ | ◯ | ◯ | ◯ | ◯ | ◯ |
| Conc. of volatilized styrene (ppm) |  | 12 | 13 | 15 | 13 | 12 | 12 |
| Surface appearance |  | Good | Good | Good | Good | Good | Good |
| Bierbaum scratch hardness | $H_{S1}$ | 10 | 10 | 10 | 10 | 10 | 10 |
|  | $H_{S2}$ | 10 | 10 | 10 | 10 | 10 | 10 |
|  | $H_{H1}$ | 30 | 35 | 35 | 25 | 30 | 25 |
|  | $H_{H2}$ | 30 | 35 | 35 | 25 | 30 | 25 |

TABLE 3

|  |  | Reference Example |  |  |  |  |
|---|---|---|---|---|---|---|
|  |  | 1 | 2 | 3 | 4 | 5 |
| Resin composition: | Soft layer | A-3 | A-1 | A-2 | A-3 | A-2 |
|  | Hard layer | A-4 | A-4 | A-4 | A-6 | A-2 |
| Thickness (min): | Soft layer | 1.0 | 1.0 | 1.4 | 0.5 | 1.5 |
|  | Hard layer | 7.0 | 0.5 | 0.1 | 1.0 | 1.5 |
|  |  | (88%) | (33%) | (6.7%) | (67%) | (50%) |
|  | Total | 8.0 | 1.5 | 1.5 | 1.5 | 3.0 |
| Viscosity of soft layer (Pa · s) |  | $5 \times 10^3$ | $8 \times 10$ | $4 \times 10^2$ | $5 \times 10^3$ | $4 \times 10^2$ |
| Viscosity of hard layer (Pa · s) |  | $7 \times 10^4$ | $7 \times 10^4$ | $7 \times 10^4$ | $2 \times 10^6$ | $4 \times 10^2$ |
| Resin composition/fiber reinforced material (wt ratio) |  | 85/15 | 85/15 | 85/15 | 85/15 | 80/20 |
| Primer layer |  | Absent | Absent | Absent | Absent | Absent |
| Adhesive force (kgf/cm$^2$) |  | 21 | 30 | 25 | 15 | 25 |
| Fatigue test (fatigue) |  | A1 | A2 | A2 | A2 | A2 |
| Surface hardness (Shore D) |  | 86 | 84 | 85 | 84 | 85 |
| Recess resistance |  | No break | No break | No break | No break | No break |
| Impact resistance |  | No break | No break | No break | No break | No break |
| Application time (hrs) |  | 0.8 | 0.5 | 0.5 | 0.5 | 0.5 |
| Mounting workability |  | ◯ | ◯ | ◯ | ◯ | X |
| Conc. of volatilized styrene (ppm) |  | 18 | 12 | 18 | 12 | 12 |
| Surface appearance |  | Wrinkled | Good | Rough | Good | Rough |
| Release properties of light shielding film |  | ◯ | X | ◯ | ◯ | ◯ |
| Bierbaum scratch hardness | $H_{S1}$ | 10 | 10 | 10 | 10 | 10 |
|  | $H_{S2}$ | 10 | 10 | 10 | 10 | 10 |
|  | $H_{H1}$ | 30 | 30 | 30 | 70 | 30 |
|  | $H_{H2}$ | 30 | 30 | 30 | 70 | 30 |

TABLE 4

|  |  | Reference Example | | Comparative Example | |
| --- | --- | --- | --- | --- | --- |
|  |  | 6 | 7 | 1 | 2 |
| Resin composition: | Soft layer | A-2 | A-2 | FRP waterproof | Vinyl chloride sheet waterproof |
|  | Hard layer | A-4 | A-4 | | |
| Thickness (min): | Soft layer | 1.0 | 1.0 | | |
|  | Hard layer | 2.0 (67%) | 2.0 (67%) | | |
|  | Total | 3.0 | 3.0 | | |
| Viscosity of soft layer (Pa · s) | | $4 \times 10^2$ | $4 \times 10^2$ | | |
| Viscosity of hard layer (Pa · s) | | $7 \times 10^4$ | $7 \times 10^4$ | | |
| Resin composition/fiber reinforced material (wt ratio) | | 98/2 | 45/55 | | |
| Primer layer | | Absent | Absent | | |
| Adhesive force (kgf/cm$^2$) | | 25 | 25 | 38 | 10 |
| Fatigue test (fatigue) | | A2 | A2 | A1 | A3 |
| Surface hardness (Shore D) | | 86 | 85 | 85 | 15 |
| Recess resistance | | No break | No break | No break | No break |
| Impact resistance | | No break | No break | No break | No break |
| Application time (hrs) | | 0.5 | 0.5 | 4 | — |
| Mounting workability | | ○ | ○ | — | — |
| Conc. of volatilized styrene (ppm) | | 12 | 12 | 650 | — |
| Surface appearance | | Wrinkled | Fiber glass | Good | Good |
| Release properties of light shielding film | | ○ | ○ | — | — |
| Bierbaum scratch hardness | $H_{S1}$ | 10 | 10 | (30) | (5) |
|  | $H_{S2}$ | 10 | 10 | (30) | (5) |
|  | $H_{H1}$ | 30 | 30 | (30) | (5) |
|  | $H_{H2}$ | 30 | 30 | (30) | (5) |

Note: ( ) = referential value

EXAMPLE 7

[Preparation of a waterproof material (a composite laminate)]

100 parts of unsaturated polyester resin (trade name Ester WP260), 1.0 part of a photopolymerization initiator (trade name Irgacure 1700) and 1.0 part of a thickener (magnesium oxide) were uniformly stirred by a disper, thereby preparing a resin composition.

Next, a waterproof sheet was prepared from 15 parts of cut glass rovings (cut length=50 mm, made by Asahi Fiber Glass Co., Ltd.) and 85 parts by weight of the above resin composition by the use of an SMC impregnating machine (made by Tsukishima Kikai Co., Ltd.) to which a vinyl chloride resin sheet (made by Tsutsunaka Sheet Boosui Co., Ltd., made of a Sunloid DN sheet, hole area=20%, thickness=1.0 mm) was previously attached. In this waterproof sheet, the sheet thickness of a resin composition (C) was 1.5 mm, and the total thickness of the waterproof sheet was 2.5 mm. Furthermore, both the sides of the waterproof sheet were covered with light shielding films (polyester laminate aluminum foils, made by Hosokawa Youkou Co., Ltd.). Next, the light shielding film on the side of a vinyl chloride resin sheet (D) in the waterproof sheet was peeled off, and the waterproof material was spread on a substrate (a concrete plate or a asbestos cement plates) so that the vinyl chloride resin sheet (D) might come in contact with the substrate, and then pressed by a roller. Afterward, the other upper light shielding film was peeled off, and the waterproof material was then cured with the sunlight to obtain a test piece in which a waterproof layer was formed on the substrate, and the test piece was then tested.

As a result, the waterproof layer could be obtained in which a waterproof application could be accomplished in a short period of time; a surface hardness was high; and an adhesive force to an substrate, a blister resistance, a fatigue test, an substrate crack resistance and a surface appearance were good.

EXAMPLE 8

(In the case that a vinyl chloride resin sheet was replaced with a vulcanized rubber sheet)

The same procedure as in Example 1 was conducted except that a vinyl chloride resin sheet was replaced with a vulcanized rubber sheet (made of Mitsuboshi Plast Sheet PS15, made by Tajima Roofing Co., Ltd., hole area=20%, thickness=1.5 mm) in the middle step of Example 7, thereby obtaining a test piece, and it was then tested.

As a result, a waterproof layer could be obtained in which a waterproof application could be accomplished in a short period of time; a surface hardness was high; and an adhesive force to an substrate, a blister resistance, a fatigue test, an substrate crack resistance and a surface appearance were good.

EXAMPLE 9

[In the case that a sheet thickness of a resin composition (C) was changed from 1.5 to 3.0 mm]

The same procedure as in Example 1 was conducted except that the thickness of a sheet layer of a resin composition (C) was changed from 1.5 to 3.0 mm in the middle step of Example 7, thereby obtaining a test piece, and it was then tested.

As a result, a waterproof layer could be obtained in which a waterproof application could be accomplished in a short period of time; a surface hardness was high; and an adhesive force to an substrate, a blister resistance, a fatigue test, an substrate crack resistance and a surface appearance were good.

EXAMPLE 10

(In the case that the hole area of a vinyl chloride resin sheet was changed from 20% to 50%)

The same procedure as in Example 1 was conducted except that the hole area of a vinyl chloride resin sheet was changed from 20% to 50% in the middle step of Example 7, thereby obtaining a test piece, and it was then tested.

As a result, a waterproof layer could be obtained in which a waterproof application could be accomplished in a short period of time; a surface hardness was high; and an adhesive force to an substrate, a blister resistance, a fatigue test, an substrate crack resistance and a surface appearance were good.

EXAMPLE 11
(In the case that a primer was applied)

The same procedure as in Example 1 was conducted except that a primer (trade name Sun PC-F, a one-pack type moisture-setting urethane resin, made by Mitsui Toatsu Chemicals, Inc.) was applied onto a substrate at 0.3 kg/m$^2$ and then cured in the latter part of Example 7, thereby obtaining a test piece, and it was then tested.

As a result, a waterproof layer could be obtained in which a waterproof application could be accomplished in a short period of time; a surface hardness was high; and an adhesive force to an substrate, a blister resistance, a fatigue test, an substrate crack resistance and a surface appearance were good.

REFERENCE EXAMPLE 8
(In the case that a sheet layer of a resin composition (C) was thicker than a preferable thickness)

The same procedure as in Example 1 was conducted except that the thickness of a sheet layer of a resin composition (C) was changed from 1.5 mm to 5.5 mm in the middle step of Example 7, thereby obtaining a test piece, and it was then tested.

As a result, a waterproof layer could be obtained in which a waterproof application could be accomplished in a short period of time; a surface hardness was high; an adhesive force to an substrate, a blister resistance, a fatigue test and an substrate crack resistance were good; but wrinkles appeared on the surface. Therefore, such a layer was undesirable as the waterproof layer.

REFERENCE EXAMPLE 9
(In the case that a hole area of a vinyl chloride resin sheet was larger than a preferable area)

The same procedure as in Example 1 was conducted except that a hole area of a vinyl chloride resin sheet was changed from 20% to 90% in the middle step of Example 7, thereby obtaining a test piece, and it was then tested.

As a result, a waterproof layer could be obtained in which a waterproof application could be accomplished in a short period of time; a surface hardness was high; an adhesive force to an substrate and a blister resistance were good; but the results of a fatigue test were bad, i.e., A2. Thus, break occurred during an substrate crack resistance test, which meant that such a layer was undesirable as the waterproof layer.

COMPARATIVE EXAMPLE 3
(In the case of a urethane coating waterproof material)

A test piece having a urethane coating waterproof material was prepared by Sunsiral B-1 method (made by Mitsui Toatsu Chemicals, Inc.), and it was then tested.

As a result, a waterproof application time was long, and the results of a blister resistance were bad, i.e., blister 2. Furthermore, in the tests of a recess resistance and an impact resistance, break occurred. That is to say, the waterproof material still had room for improvement.

COMPARATIVE EXAMPLE 4
(In the case of an FRP coating waterproof material)

A test piece having an FRP waterproof material was prepared by a Rimaster-RB-1 method (made by Mitsui Toatsu Chemicals, Inc.), and it was then tested.

As a result, a surface hardness was high, and an adhesive force to an substrate and a blister resistance were good. However, a waterproof application time was as long as 4 hours, and the results of a fatigue test were evaluated to be A1. Thus, break occurred during an substrate crack resistance test, which meant that such a layer was undesirable as a waterproof layer. Consequently, in points of the application time, the fatigue properties and the crack resistance, the waterproof material had room for improvement.

COMPARATIVE EXAMPLE 5
(In the case of a vinyl chloride sheet waterproof material)

A test piece having a vinyl chloride sheet waterproof material was prepared, and it was then tested.

As a result, a surface hardness was low, and an adhesive force to an substrate was low. In addition, a blister resistance was 3 and a fatigue test was also A3. Therefore, an obtained layer was undesirable as a waterproof layer.

TABLE 5

|  | Example | | | | |
| --- | --- | --- | --- | --- | --- |
|  | 7 | 8 | 9 | 10 | 11 |
| Sheet layer (C) (Hard layer) | | | | | |
| Thickness (mm) | 1.5 | 1.5 | 3.0 | 1.5 | 1.5 |
| Sheet layer (D) (Soft Layer) | | | | | |
| Material | Vinyl chloride | Vulcanized rubber | Vinyl chloride | Vinyl chloride | Vinyl chloride |
| Thickness (mm) | 1.0 | 1.5 | 1.0 | 1.0 | 1.0 |
| Hole area(%) | 20 | 20 | 20 | 50 | 20 |
| Primer layer | absent | absent | absent | absent | absent |
| Adhesive force (kgf/cm$^2$) | 15 | 15 | 15 | 21 | 20 |
| Undercoat crack resistance | | | | | |
| Elongation (%) | 20 | 25 | 20 | 18 | 20 |
| Strength (kgf) | 215 | 198 | 236 | 228 | 206 |
| Peel width (mm) | 82 | 78 | 103 | 122 | 88 |
| Fatigue test (fatigue) | A4 | A4 | A4 | A4 | A4 |
| Blister resistance (blister) | 4 | 4 | 4 | 4 | 4 |

TABLE 5-continued

|  |  | Example | | | | |
|---|---|---|---|---|---|---|
|  |  | 7 | 8 | 9 | 10 | 11 |
| Surface hardness (Shore D) | | 87 | 87 | 87 | 87 | 87 |
| Recess resistance | | No break | No break | No break | No break | No break |
| Impact resistance | | No break | No break | No break | No break | No break |
| Application time (hrs) | | 0.5 | 0.5 | 0.5 | 0.5 | 0.5 |
| Surface appearance | | Good | Good | Good | Good | Good |
| Bierbaum scratch | $H_{S1}$ | 5 | 3 | 5 | 5 | 5 |
| hardness | $H_{S2}$ | 5 | 3 | 5 | 5 | 5 |
|  | $H_{H1}$ | 30 | 30 | 30 | 30 | 30 |
|  | $H_{H2}$ | 30 | 30 | 30 | 30 | 30 |

Note: ( ) = referential value

TABLE 6

|  |  | Reference Example | | Comparative Example | | |
|---|---|---|---|---|---|---|
|  |  | 8 | 9 | 3 | 4 | 5 |
| Sheet layer (C) (Hard layer) | | | | | | |
| Thickness (mm) | | 5.5 | 1.5 | Urethane waterproof material | FRP waterproof material | Vinyl chloride waterproof |
| Sheet layer (D) (Soft layer) | | | | | | |
| Material | | Vinyl chloride | Vinyl chloride | | | |
| Thickness (mm) | | 1.0 | 1.0 | | | |
| Hole area(%) | | 20 | 90 | | | |
| Primer layer | | absent | absent | | | |
| Adhesive force (kgf/cm²) | | 15 | 35 | 18 | 38 | 100 |
| Undercoat crack resistance | | | | | | |
| Elongation (%) | | 20 | Break | 20 | Break | 60 |
| Strength (kgf) | | 255 | 360 | 162 | 355 | 245 |
| Peel width (mm) | | 133 | 5 | 60 | 0 | 33 |
| Fatigue test (fatigue) | | A4 | A2 | A4 | A1 | A3 |
| Blister resistance (blister) | | 4 | 4 | 2 | 4 | 3 |
| Surface hardness (Shore D) | | 87 | 87 | 10 | 85 | 15 |
| Recess resistance | | No break | No break | Break | No break | Break |
| Impact resistance | | No break | No break | Break | No break | Break |
| Application time (hrs) | | 0.7 | 0.5 | 48 | 4 | — |
| Surface appearance | | Wrinkled | Good | Good | Good | Good |
| Bierbaum scratch | $H_{S1}$ | 5 | 5 | (15) | (30) | (5) |
| hardness | $H_{S2}$ | 5 | 5 | (15) | (30) | (5) |
|  | $H_{H1}$ | 30 | 30 | (15) | (30) | (5) |
|  | $H_{H2}$ | 30 | 30 | (15) | (30) | (5) |

Note: ( ) = referential value

What is claimed is:

1. A photo-setting sheet of waterproof material which is formed by dispersing a fiber reinforced material in a resin composition comprising a thermosetting resin, a photopolymerization initiator and a thickener to form a sheet of waterproof material comprising at least two layers having different hardness wherein the cured hardness of a soft layer of the waterproof material that is made to adhere to a substrate is lower than the cured hardness of a hard layer of the waterproof material.

2. The waterproof material according to claim 1 wherein a surface of the hard layer is laminated with a light shielding film.

3. A photo-setting sheet of waterproof material obtained by the steps of: forming a hard layer comprising a photo setting fiber reinforced thermosetting resin composition layer obtained by dispersing a fiber reinforced material in a resin composition comprising a thermosetting resin, a photopolymerization initiator and a thickener to form a surface layer, and then integrally laminating a synthetic polymer sheet as a soft layer.

4. The waterproof material according to claim 3 wherein the synthetic polymer sheet layer is selected from the group consisting of a vulcanized rubber sheet layer, a non-vulcanizing rubber sheet layer, a vinyl chloride resin sheet, an ethylene vinyl acetate resin sheet layer and a urethane rubber sheet layer.

5. The waterproof material according to claim 3 wherein the synthetic polymer sheet is a sheet having holes, and the area of the holes is in the range of 2 to 80% based on the whole area.

6. The waterproof material according to claim 1 wherein the resin composition comprises a first resin composition having a viscosity ($\eta_1$) of $10^2$ to $10^5$ Pa·s (25° C.) which forms the soft layer, and a second resin composition having a viscosity ($\eta_2$) of $10^3$ to $10^6$ Pa·s (25° C.) which forms the hard layer and being in a relation of $n_1<n_2$.

7. The waterproof material according to claim 1 wherein a relation between a thickness ($T_1$) of the soft layer and a thickness ($T_2$) of the hard layer meets the relation $10\%<(T_2)/[(T_1)+(T_2)]<85\%$.

8. The waterproof material according to claim 1 wherein the thermosetting resin is one selected from the group consisting of unsaturated polyester resins, vinyl ester resins and vinylurethane resins.

9. A photo-setting sheet of waterproof material which is obtainable by densely dispersing a fiber reinforced material in a surface layer of a resin composition containing a thermosetting resin, a photopolymerization initiator and a thickener to form a sheet of waterproof material in which the fiber reinforced material is loosely dispersed near a back layer made to adhere to a substrate and densely dispersed near a surface layer, thereby obtaining a cured hardness of the surface layer higher than the cured hardness of the back layer.

10. A method for applying a waterproof layer which comprises the steps of spreading a photo-setting sheet of waterproof material and rotatively pressing the sheet of waterproof material in such a way that a soft layer of the waterproof material adheres to a substrate to be applied, and then photo-setting the waterproof material to simultaneously form a hard layer which functions as a fiber reinforced waterproof layer and the soft layer which functions as a buffer layer, said photo-setting sheet of waterproof material being formed by dispersing a fiber reinforced material in a resin composition comprising a thermosetting resin, a photopolymerization initiator and a thickener to form a sheet of waterproof material comprising at least two layers having different hardness; and wherein the cured hardness of the soft layer of the waterproof material that is made to adhere to a substrate is lower than the cured hardness of the hard layer of the waterproof material.

* * * * *

UNITED STATES PATENT AND TRADEMARK OFFICE
CERTIFICATE OF CORRECTION

PATENT NO. : 5,935,683
DATED : August 10, 1999
INVENTOR(S) : Takashi IIYAMA et al.

It is certified that error appears in the above-identified patent and that said Letters Patent is hereby corrected as shown below:

On the title page, under item [56] add the following publications:

-- JIS-A-5304, Concrete Flags, pp. 10-15 and p. 1-5 (1994;

Japanese Architectural Standard Specification JASS 8, pp. 34-339 (1986);

KMK method: Housing and Urban Development Corporation --.

Signed and Sealed this

Twenty-ninth Day of May, 2001

*Attest:*

NICHOLAS P. GODICI

*Attesting Officer*  *Acting Director of the United States Patent and Trademark Office*